United States Patent
Jeong et al.

(10) Patent No.: US 9,661,654 B2
(45) Date of Patent: May 23, 2017

(54) APPARATUS AND METHOD FOR ACCESSING RANDOM ACCESS CHANNEL IN A WIRELESS COMMUNICATION SYSTEM

(75) Inventors: Kyeong-In Jeong, Hwaseong-si (KR); Soeng-Hun Kim, Suwon-si (KR); Jung-Soo Jung, Seongnam-si (KR); Sang-Bum Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/521,386

(22) PCT Filed: Jan. 12, 2011

(86) PCT No.: PCT/KR2011/000218
§ 371 (c)(1),
(2), (4) Date: Jul. 10, 2012

(87) PCT Pub. No.: WO2011/087274
PCT Pub. Date: Jul. 21, 2011

(65) Prior Publication Data
US 2012/0320842 A1    Dec. 20, 2012

(30) Foreign Application Priority Data
Jan. 12, 2010    (KR) ........................ 10-2010-0002576

(51) Int. Cl.
*H04W 74/00*    (2009.01)
*H04W 74/08*    (2009.01)

(52) U.S. Cl.
CPC .......... *H04W 74/006* (2013.01); *H04W 74/08* (2013.01); *Y02B 60/50* (2013.01)

(58) Field of Classification Search
CPC ..... H04W 74/006; H04W 74/08; Y02B 60/50
USPC ........................................................ 370/329
See application file for complete search history.

(56) References Cited

U.S. PATENT DOCUMENTS

| | | | | |
|---|---|---|---|---|
| 8,040,913 B2* | 10/2011 | Lee | ..................... | H04W 74/002 370/445 |
| 8,401,031 B2* | 3/2013 | Park | .................... | H04W 74/006 370/431 |
| 2003/0224719 A1* | 12/2003 | Lucidarme | ............ | H04W 48/02 455/1 |

(Continued)

FOREIGN PATENT DOCUMENTS

| | | |
|---|---|---|
| CA | 2715075 | 8/2009 |
| EP | 2 023 548 | 2/2009 |

(Continued)

OTHER PUBLICATIONS

PCT/ISA/237 Written Opinion issued on PCT/KR2011/000218 (pp. 4).

(Continued)

*Primary Examiner* — Jae Y Lee
(74) *Attorney, Agent, or Firm* — The Farrell Law Firm, P.C.

(57) ABSTRACT

An apparatus and method for accessing a Random Access Channel (RACH) at a low-power terminal in a wireless communication system are provided, in which resource allocation information is acquired according to used resource identification information included in system information broadcast from a Base Station (BS), and a random access preamble is transmitted to the BS according to the acquired resource allocation information.

20 Claims, 7 Drawing Sheets

(56) References Cited

U.S. PATENT DOCUMENTS

| | | | |
|---|---|---|---|
| 2008/0037413 A1* | 2/2008 | Gu | H04W 52/56 370/210 |
| 2008/0267126 A1* | 10/2008 | Vujcic et al. | 370/330 |
| 2009/0196192 A1* | 8/2009 | Lim | H04W 52/247 370/252 |
| 2009/0197631 A1* | 8/2009 | Palanki | H04W 72/0413 455/522 |
| 2010/0015967 A1* | 1/2010 | Perets | H04W 4/00 455/422.1 |
| 2010/0103889 A1* | 4/2010 | Kim | H04W 74/004 370/329 |
| 2010/0208597 A1* | 8/2010 | Chun | H04W 74/002 370/252 |
| 2010/0215013 A1* | 8/2010 | Chun et al. | 370/329 |
| 2010/0309877 A1* | 12/2010 | Damnjanovic | H04L 1/0029 370/331 |
| 2010/0331003 A1* | 12/2010 | Park | H04W 74/0866 455/450 |
| 2011/0045837 A1* | 2/2011 | Kim | H04W 74/0833 455/452.1 |
| 2011/0194501 A1* | 8/2011 | Chung | H04L 5/0053 370/328 |
| 2011/0235609 A1* | 9/2011 | Ahn | H04L 5/0007 370/329 |

FOREIGN PATENT DOCUMENTS

| | | |
|---|---|---|
| EP | 2 106 056 | 9/2009 |
| KR | 1020070080553 | 8/2007 |
| KR | 1020080112119 | 12/2008 |
| KR | 1020090043434 | 5/2009 |
| KR | 1020090131640 | 12/2009 |
| WO | WO 2008/023932 | 2/2008 |
| WO | WO 2008133479 | 11/2008 |
| WO | WO 2008/156315 | 12/2008 |

OTHER PUBLICATIONS

PCT/ISA/210 Search Report issued on PCT/KR2011/000218 (pp. 7).

European Search Report dated Oct. 21, 2016 issued in counterpart application No. 11733061.3-1854, 9 pages.

Korean Office Action dated Feb. 21, 2017 issued in counterpart application No. 10-2011-0003282, 9 pages.

* cited by examiner

APPARATUS AND METHOD FOR ACCESSING RANDOM ACCESS CHANNEL IN A WIRELESS COMMUNICATION SYSTEM

PRIORITY

This application is a National Phase Entry of PCT International Application No. PCT/KR2011/000218, which was filed Jan. 12, 2011, and claims priority to Korean Patent Application No. 10-2010-0002576, which was filed in the Korean Industrial Property Office on Jan. 12, 2010, the content of each of which is incorporated herein by reference.

TECHNICAL FIELD

The present invention relates to an apparatus and method for accessing a Random Access CHannel (RACH) in a wireless communication system, and more particularly, to an apparatus and method for accessing an RACH at a low-power terminal.

BACKGROUND ART

In general, wireless communication technology was developed to provide a wireless communication service, ensuring mobility for users. The wireless communication technology has reached a level at which high-speed data service as well as voice service can be supported.

Along with the development trend, the $3^{rd}$ Generation Partnership Project (3GPP) has been working on standardizing a future-generation wireless communication system, Long Term Evolution (LTE). LTE is a technology that achieves a high-speed packet service at up to 100 Mbps.

Active discussion is underway to provide a new service based on LTE in a wireless communication system. One of technologies for providing a new LTE-based service is Machine To Machine/Machine Type Communication (M2M/MTC). M2M/MTC refers to communication between electronic devices or between a server and an electronic device over a wireless communication network.

When M2M/MTC was introduced, it was considered to be a concept applicable only to remote control or telematics service. That is, the market that was expected to be created from M2M/MTC was very limiting. However, the past few years have witnessed the soaring growth of M2M/MTC and thus M2M/MTC is attracting global interest as a promising market. That is, the M2M/MTC market is extended to car telematics, logistics, intelligent metering systems, remote asset management systems, Point Of Sales (POS) systems, and security-related fields.

An M2M/MTC device is characterized by its relatively low transmission power, compared to a legacy wireless terminal (hereinafter, referred to as a 'high-power terminal'). In this context, the M2M/MTC device is referred to as a 'low-power terminal'.

The purpose of using low-power terminals in the M2M/MTC technology is to widespread the M2M/MTC technology by reducing the price of an M2M/MTC communication module.

In view of the nature of M2M/MTC, low-power terminals are expected to often transmit uplink data when needed. Therefore, there exists a need for specifying a method for transmitting data to a Base Station (BS) on an RACH by a low-power terminal as is done by a high-power terminal in a 3GPP system.

DISCLOSURE OF INVENTION

Technical Problem

An aspect of embodiments of the present invention is to address at least the problems and/or disadvantages and to provide at least the advantages described below. Accordingly, an aspect of embodiments of the present invention is to provide an apparatus and method for supporting transmission of a control signal or data on an RACH from a low-power terminal in a wireless communication system.

Another aspect of embodiments of the present invention is to provide an apparatus and method for supporting access to an RACH in a wireless network where a high-power terminal coexists with a low-power terminal.

A further aspect of embodiments of the present invention is to provide an apparatus and method for transmitting an uplink message through bundling based on system information received from a BS in a wireless communication system.

Solution to Problem

The object of the present invention can be achieved by providing a method for accessing a Random Access Channel (RACH) at a low-power terminal in a wireless communication system, in which resource allocation information is acquired according to used resource identification information included in system information broadcast from a Base Station (BS), and a random access preamble is transmitted to the BS according to the acquired resource allocation information.

In another aspect of the present invention, provided herein is a low-power terminal for accessing an RACH in a wireless communication system, in which a system information analysis and storage unit acquires resource allocation information according to used resource identification information included in system information broadcast from a BS, and a wireless transceiver transmits a random access preamble according to the acquired resource allocation information to the BS.

In another aspect of the present invention, provided herein is a method for supporting access to an RACH of a low-power terminal at a BS in a wireless communication system, in which system information including used resource identification information is broadcast in a cell, the used resource identification information indicating resource allocation information to be used for access to the RACH, and a random access preamble is received from the low-power terminal, the random access preamble being transmitted according to the resource allocation information indicated by the used resource identification information by the low-power terminal.

In a further aspect of the present invention, provided herein is a BS for supporting access to an RACH of a low-power terminal in a wireless communication system, in which a system information generator generates system information including used resource identification information in a cell, the used resource identification information indicating resource allocation information to be used for access to the RACH, and a wireless transceiver broadcasts the system information generated from the system information generator and receives from the low-power terminal a random access preamble that is transmitted according to the resource allocation information indicated by the used resource identification information by the low-power terminal.

BRIEF DESCRIPTION OF DRAWINGS

The above and other objects, features and advantages of certain exemplary embodiments of the present invention will be more apparent from the following detailed description taken in conjunction with the accompanying drawings, in which.

MODE FOR THE INVENTION

Reference will now be made in detail to the preferred embodiments of the present invention with reference to the accompanying drawings. In some instances, known structures and devices are omitted, focusing on important features of the structures and devices, so as not to obscure the concept of the present invention.

Figure 1:
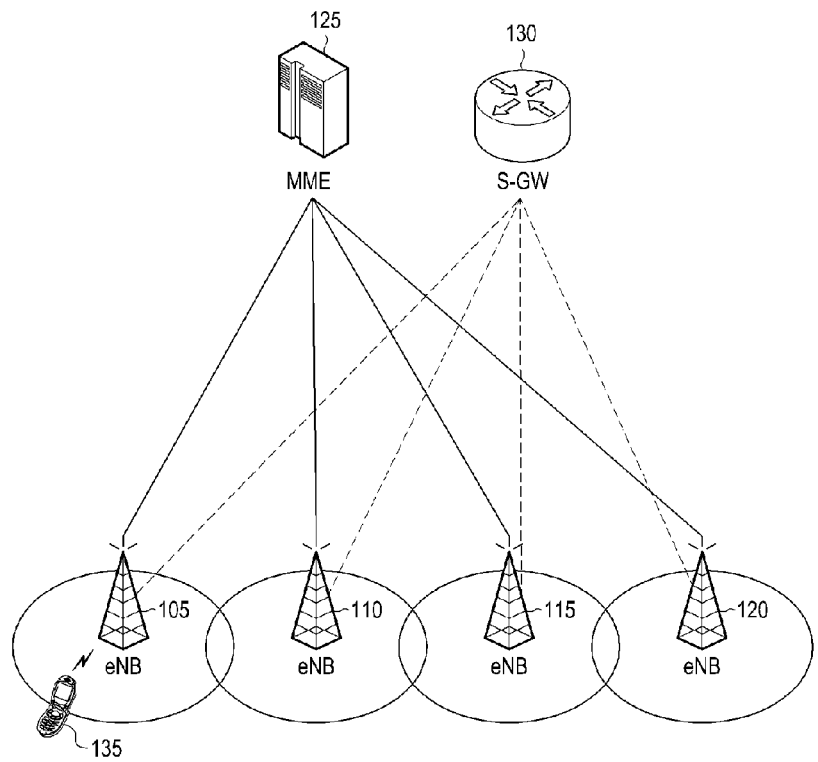
FIG. 1 illustrates the configuration of a wireless access network in a Long Term Evolution (LTE) wireless communication system to which embodiments of the present invention are applied.

FIG. 1 illustrates the configuration of a wireless access network in a Long Term Evolution (LTE) wireless communication system to which embodiments of the present invention are applied.

Referring to FIG. 1, the wireless access network includes evolved Node Bs (eNBs) 105, 110, 115 and 120, a Mobility Management Entity (MME) 125, and a ServingGateWay (S-GW) 130.

A User Equipment (UE) 135 is connected to an external network through the eNB 105 and the S-GW 130. The eNBs 105, 110, 115 and 120 correspond to Node Bs in Universal Mobile Telecommunications System (UMTS). The eNB 105 is connected to the UE 135 via a radio channel and plays a more complex role than a Node B in the UMTS system.

In the LTE system, services including a real-time service such as Voice over Internet Protocol (VoIP) are supported through a shared channel. Therefore, a device for performing scheduling by collecting information about the states of UEs is needed. The eNBs 105, 110, 115 and 120 take charge of such scheduling. A single eNB usually controls a plurality of cells.

The LTE system adopts Orthogonal Frequency Division Multiplexing (OFDM) as a wireless access technology in a bandwidth of up to 20 MHz. The LTE system also uses Adaptive Modulation and Coding (AMC) to determine a modulation scheme and a channel coding rate for a UE adaptively according to the channel state of the UE.

The S-GW 130 is a device that provides data bearers. The S-GW 130 creates or removes data bearers under the control of the MME 125. The MME 125 performs various control functions and is connected to the eNBs 105, 110, 115 and 120.

Figure 2:
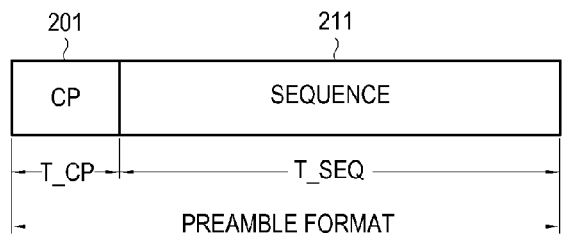
FIG. 2 illustrates the format of a Random Access CHannel (RACH) preamble used for attempting to access an RACH in a conventional wireless communication system.

FIG. 2 illustrates the format of a Random Access CHannel (RACH) preamble used for attempting to access an RACH in a conventional wireless communication system.

Referring to FIG. 2, an RACH preamble includes a Cyclic Prefix (CP) 201 and a code sequence 211. The length of the CP 201, T_CP and the length of the code sequence 211, T_SEQ are determined cell-specifically. The RACH preamble is configured in one of five formats defined in a $3^{rd}$ Generation Partnership Project (3GPP) specification TS36.211. Cell-specific information is system information broadcast to UEs within a cell.

Figure 3:
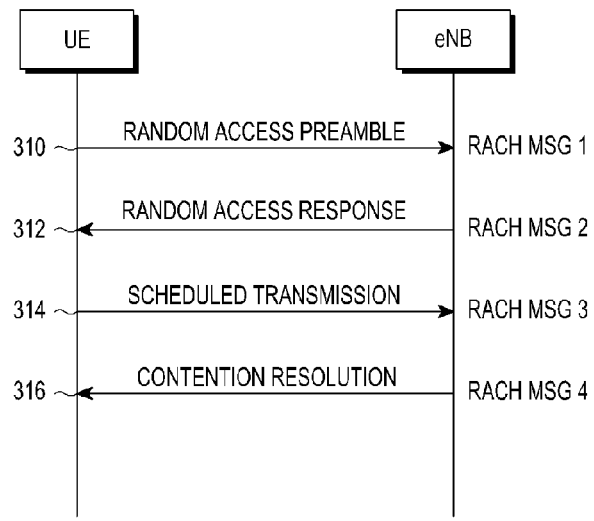
FIG. 3 is a diagram illustrating a signal flow for an RACH access procedure defined in a $3^{rd}$ Generation Partnership Project (3GPP) specification TS36.321 in the conventional wireless communication system.

FIG. 3 is a diagram illustrating a signal flow for an RACH access procedure defined in a 3GPP specification TS36.321 in the conventional wireless communication system.

While not shown in FIG. 3, a UE acquires information needed to access an RACH from system information broadcast within a cell. For example, the information acquired from the system information contains Physical RACH (PRACH) resource information, information about the number and range of RACH preambles available in a cell, and power control information. The PRACH resource information may include information about frequency resources, information about periodicity along a time axis, RACH preamble format information, etc. The power control information is used to control the transmission power of an RACH preamble. For details, refer to a 3GPP specification TS36.331.

Referring to FIG. 3, the UE selects a random access preamble, RACH MSG 1 based on the system information in order to request RACH allocation and transmits the selected random access preamble RACH MSG 1 to an eNB in step 310. The random access preamble RACH MSG 1 is configured in an RACH preamble format defined for the cell and transmitted in PRACH resources allocated in the cell.

Upon receipt of the random access preamble, RACH MSG 1 from the UE, the eNB transmits a random access response message RACH MSG 2 in response to the random access preamble RACH MSG 1 to the UE in step 312. The random access response message RACH MSG 2 includes a preamble Identifier (ID) that identifies the random access preamble RACH MSG 1, Timing Advance (TA) information for correcting an uplink timing, uplink resource allocation information for transmission of an uplink message, and a Radio Network Temporary Identifier (RNTI) of the UE.

In step 314, the UE transmits an uplink message RACH MSG 3 to the eNB using allocated resources indicated by the random access response message RACH MSG 2. The uplink message RACH MSG 3 includes an SAE-Temporary Mobile Subscriber Identity (S-TMSI) of the UE or a random number. The uplink message generically refers to data as well as an uplink control message.

In response to the uplink message, RACH MSG 3, the eNB transmits a contention resolution message RACH MSG 4 to the UE in step 316. The contention resolution message RACH MSG 4 includes the S-TMSI of the UE or the random number received from the UE. The eNB replies to the UE with the contention resolution message RACH MSG 4 in order to prevent collision that might occur.

For instance, even though a collision situation may occur due to simultaneous transmission of the same random access preamble RACH MSG 1 from a plurality of UEs, the UEs can determine whether they have succeeded in accessing an RACH from the S-TMSI of a UE or a random number set in the contention resolution message RACH MSG 4. Specifically, each UE compares the S-TMSI or random number set in the contention resolution message RACH MSG 4 with a value set in an uplink message RACH MSG 3 that the UE transmitted. If the two values are identical, the UE determines that it has succeeded in accessing an RACH. On the other hand, if the two values are different, the UE re-performs the RACH access procedure, considering that it has failed in the RACH access.

While the above RACH access procedure may be applied to a low-power terminal without any modification, the RACH access procedure may not be successful due to a factor such as a network environment because an RACH preamble format defined for a cell is designed for RACH access of high-power terminals.

For example, the length of a code sequence in an RACH preamble is set for RACH access of a high-power terminal. Thus, the code sequence may be short for a low-power terminal. As a consequence, an eNB may not receive an RACH preamble from a low-power terminal due to insufficient transmission power of the RACH preamble.

Even though an RACH preamble format defined in a current cell is applicable to low-power terminals, it may not be preferred that RACH access attempts of many low-power terminals affect an RACH access attempt of a high-power terminal.

For example, RACH access attempts from a large number of low-power terminals may cause congestion to RACH access attempts of high-power terminals, thereby significantly delaying the RACH accesses of the high-power terminals.

Transmission of an uplink message as well as transmission of a random access preamble may be impossible for low-power terminals. That is, if PRACH resources and an RACH access procedure configured for high-power terminals are still applied to low-power terminals, the low-power terminals have difficulty in succeeding in RACH access. Moreover, the RACH accesses of the low-power terminals may adversely affect RACH accesses of high-power terminals.

Embodiments of the present invention as described later are intended to provide methods for supporting a low-power terminal's transmission of an uplink message on an RACH. For this purpose, an RACH access procedure should first be defined to allocate an RACH to the low-power terminal.

In accordance with the embodiments of the present invention, four scenarios are considered for RACH access of a low-power terminal.

One of the four scenarios is that a low-power terminal performs an RACH access using PRACH resource allocation information configured for low-power terminals (hereinafter, referred to as 'extended PRACH resource allocation information') and applies Transmission Time Interval (TTI) bundling during the RACH access.

Another scenario is that a low-power terminal performs an RACH access using extended PRACH resource allocation information, without TTI bundling.

A third scenario is that a low-power terminal performs an RACH access using PRACH resource allocation information configured for high-power terminals (hereinafter, referred to as 'basic PRACH resource allocation information') and applies TTI bundling during the RACH access.

The last scenario is that a low-power terminal performs an RACH access using basic PRACH resource allocation information without TTI bundling.

The basic PRACH resource allocation information is system information having a basic format (hereinafter, referred to as 'basic system information'), broadcast within a cell. The extended PRACH resource allocation information is system information having an extended format (hereinafter, referred to as 'extended system information'), broadcast within a cell.

The basic PRACH resource allocation information and the extended PRACH resource allocation information commonly include RACH preamble configuration information and information about time and frequency resources for transmitting an RACH preamble. The RACH preamble configuration information contains bundling information needed to apply TTI bundling. For instance, the bundling information includes a bundling application indicator and the number of bundling subframes.

Now, embodiments of the present invention will be described in detail with reference to the attached drawings.

Figure 4:
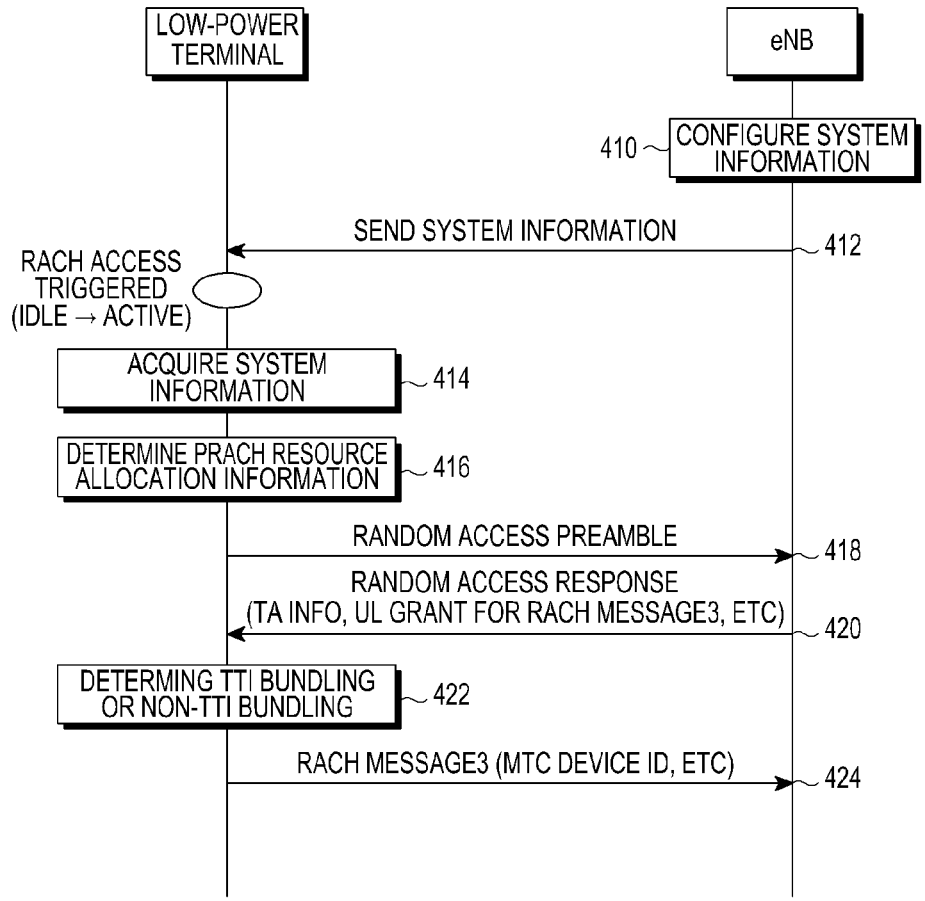
FIG. 4 is a diagram illustrating a signal flow for an RACH access procedure between a low-power terminal and an evolved Node B (eNB) according to an embodiment of the present invention.

FIG. 4 is a diagram illustrating a signal flow for an RACH access procedure between a low-power terminal and an eNB according to an embodiment of the present invention.

Referring to FIG. 4, the eNB determines PRACH resources to be allocated to the low-power terminal and configures system information, taking into account the determined PRACH resources in step 410. For example, the system information includes used resource identification information, basic PRACH resource allocation information, extended PRACH resource allocation information, and RACH access information.

The system information may be separately configured for high-power terminals and low-power terminals. The system information for high-power terminals and the system information for low-power terminals are basic system information and extended system information, respectively. In this case, the basic system information includes the used resource identification information, the basic PRACH resource allocation information, and RACH access information, whereas the extended system information includes the extended PRACH resource allocation information and RACH access information. The basic system information and the extended system information may contain different RACH access information.

The system information is described below in greater detail.

The used resource identification information indicates PRACH resources which low-power terminals are supposed to use for RACH access. That is, the low-power terminals can determine whether to use existing PRACH resources or additional PRACH resources for RACH access based on the used resource identification information. Using the existing PRACH resources means that the basic PRACH resource allocation information is used, and using the additional PRACH resources means that the extended PRACH resource allocation information is used.

The low-power terminals may determine PRACH resources to be used for RACH access, for example, according to a cell size. Specifically, if a cell is small, the low-power terminals determine to use the basic PRACH resource allocation information for RACH access because the low-power terminals can successfully transmit an RACH preamble in a basic RACH preamble format in the small cell. The basic RACH preamble format is designed for high-power terminals.

Therefore, the eNB may or may not allocate extended PRACH resources depending on PRACH resources that the low-power terminals will use for RACH access.

If the low-power terminals determine to use the additional PRACH resources for RACH access, the eNB allocates the additional PRACH resources to the low-power terminals. The PRACH resources for the low-power terminals may be PRACH resources for high-power terminals or other PRACH resources.

On the other hand, if the low-power terminals determine to use the existing PRACH resources for RACH access, the low-power terminals share the existing PRACH resources with the high-power terminals. The existing PRACH resources are PRACH resources allocated to the high-power terminals for RACH access.

The eNB may notify the low-power terminals of PRACH resources to be used for RACH access explicitly or implicitly.

In case of explicit notification, the eNB indicates resources to be used for RACH access directly to the low-power terminals. For example, the afore-described used resource identification information is included in system information.

In case of implicit notification, the low-power terminals determine what resources to use for RACH access depending on whether the extended PRACH resource allocation information is provided. The extended PRACH resource allocation information may be provided in basic system information or extended system information.

In an exemplary explicit scheme, the used resource identification information is set to 'true' or 'false' in one used resource identification bit. If the used resource identification information is set to 'true', a low-power terminal uses the basic RACH resource allocation information for RACH access. If the used resource identification information is set to 'false', the low-power terminal uses the extended RACH resource allocation information for RACH access. Needless to say, the opposite case is possible, when RACH resource allocation information to be used for RACH access is determined based on the value of used resource identification information.

In another exemplary explicit scheme, a power offset may be used as used resource identification information. The power offset is preferably set, taking into account a power level at which an eNB can successfully receive an RACH preamble transmitted based on basic PRACH resource allocation information by a low-power terminal. For example, the power offset may be determined based on a maximum output power $P_{max}$ of the low-power terminal and a power level required for the low-power terminal to transmit an RACH preamble using basic PRACH resource allocation information.

In a further explicit scheme, a specific threshold may be used as the used resource identification information. A low-power terminal compares its maximum output power $P_{max}$ with the threshold and selects PRACH resource allocation information for RACH access according to the comparison result.

Basic PRACH resource allocation information is configured to allocate PRACH resources in which high-power terminals access an RACH. However, the PRACH resources allocated by the basic PRACH resource allocation information may be used for RACH access of a low-power terminal, when needed.

For instance, the basic PRACH resource allocation information includes information about PRACH resources in the frequency domain, information about PRACH resources in the time domain, and information about an RACH preamble format. The RACH preamble format information specifies the format of an RACH preamble to be used for RACH access.

Extended PRACH resource allocation information is configured to allocate PRACH resources to low-power terminals, for RACH access. For instance, the extended PRACH resource allocation information includes information about PRACH resources in the frequency domain, information about PRACH resources in the time domain, and information about an RACH preamble format. The RACH preamble format information specifies the format of an RACH preamble to be used for a low-power terminal to access an RACH.

PRACH resources are allocated with a relatively long period by the extended PRACH resource allocation information, compared to PRACH resources allocated by the basic PRACH resource allocation information. The length of a code sequence in an RACH preamble set in the RACH preamble format information of the extended PRACH resource allocation information is larger than the length of a code sequence in an RACH preamble set in the RACH preamble format information of the basic PRACH resource allocation information.

Preferably, the extended PRACH resource allocation information is included in system information, only if low-power terminals use additional PRACH resources for RACH access.

RACH access information refers to information required for high-power terminals or low-power terminals to perform an RACH access procedure. Particularly, RACH access information for low-power terminals includes bundling information.

The bundling information includes a bundling application indicator and the number of bundling subframes. The bundling application indicator indicates whether a low-power terminal is to use TTI bundling during uplink message transmission. The number of bundling subframes is the number of subframes to be used for TTI bundling during the uplink message transmission. As many successive subframes as the numbers of bundling subframes are used for TTI bundling.

Power required to transmit each subframe can be reduced by transmitting an uplink message in a plurality of successive subframes through TTI bundling. Accordingly, the low-power transmission power limitation inherent to low-power terminals can be overcome.

The bundling information may be provided in a random access response message RACH MSG 2 that an eNB transmits to a low-power terminal in the RACH access procedure, not in the basic or extended PRACH resource allocation information.

In addition, the eNB does not increase a value tag even though system information is generated or changed for low-power terminals. The value tag indicates whether system information has been changed for high-power terminals. Thus, the high-power terminals determine from the value tag whether the system information has been changed.

In another embodiment, generation or change of system information for low-power terminals is not signaled in order not to affect high-power terminals.

In a further embodiment, when system information is generated or changed for low-power terminals, an indicator indicating generation or change of the system information for low-power terminals is transmitted. For example, the indicator may be added to a message indicating change of system information broadcast in a cell. The message may be a paging message.

If system information for low-power terminals is generated or changed, the low-power terminals are supposed to re-acquire the system information in the above embodiments. Unless the above embodiments are specified, high-power terminals may consume power for reacquisition of the system information configured for the low-power terminals.

Once system information is configured as described above, the eNB broadcasts the system information to terminals within the cell in step 412. The terminals include low-power terminals as well as high-power terminals.

The broadcast system information includes PRACH resource allocation information and information required for an RACH access procedure, for the low-power terminals.

Upon receipt of the system information from the eNB, the low-power terminal monitors whether the system information needs to be reacquired in step 414. For example, if an RACH access is triggered by generation of an uplink message to be transmitted, the low-power terminal determines to reacquire the system information. Generation of an uplink message to be transmitted may mean that the low-power terminal has transitioned from idle mode to active mode, upon request of a higher layer.

If determining to reacquire the system information, the low-power terminal reacquires the system information received from the eNB, considering that already acquired system information of the current cell is not valid. The system information transmitted by the eNB in step 412 is reacquired.

According to the 3GPP TS36.331 standard, a high-power terminal continuously monitors change of system information broadcast in a cell and reacquires system information each time the system information is changed.

However, it is expected that data transmission and reception does not occur frequently and delay of data transmission and reception is tolerated for low-power terminals. Therefore, it is not preferred that the low-power terminals continuously monitor change of system information or reacquire system information each time the system information is changed. Hence, the low-power terminals preferably reacquire system information broadcast in a cell, only when an RACH access is triggered.

The low-power terminal determines PRACH resource allocation information to be used for RACH access, based on the reacquired system information in step 416. Specifically, the low-power terminal determines whether to use basic PRACH resource allocation information configured for high-power terminals or extended PRACH resource allocation information configured for low-power terminals, for RACH access.

For example, the determination may be made according to an explicit or implicit scheme.

When the low-power terminal determines PRACH resource allocation information to be used in an implicit manner, it determines whether the acquired system information includes extended PRACH resource allocation information. In the presence of the extended PRACH resource allocation information, the low-power terminal determines to use the extended PRACH resource allocation information. In the absence of the extended PRACH resource allocation information, the low-power terminal determines to use the basic PRACH resource allocation information.

When the low-power terminal determines PRACH resource allocation information to be used in an explicit manner, it makes the determination using used resource identification information included in the reacquired system information. For example, the used resource identification information may be one of a used resource identification bit, a power offset, and a threshold.

In the case where the used resource identification information is a used resource identification bit, the low-power terminal checks the value of the used identification bit. If the value of the used identification bit indicates 'true (e.g. 1)', the low-power terminal determines to use the basic PRACH resource allocation information. If the value of the used identification bit indicates 'false (e.g. 0)', the low-power terminal determines to use the extended PRACH resource allocation information. The opposite case is also possible.

In the case where the used resource identification information is a power offset, the low-power terminal calculates an error power using the difference between its maximum output power $P_{max}$ and a power required to transmit an RACH preamble based on the basic PRACH resource allocation information. Then the low-power terminal compares the calculated error power with a power offset set in the system information and determines which PRACH resource allocation information to use according to the comparison result.

For example, if the error power is equal to or greater than the acquired power offset, the low-power terminal determines to use the basic PRACH resource allocation information. This determination is possible because even a low-power terminal can successfully transmit an RACH preamble using the basic PRACH resource allocation information if it is located at the center of a cell or the cell is not large. That is, the low-power terminal selects the basic PRACH resource allocation information, if the transmission power of the low-power terminal is sufficient to successfully transmit an RACH preamble in PRACH resources allocated by the basic PRACH resource allocation information.

Power required to transmit an RACH preamble using the basic PRACH resource allocation information may be determined to be 'PREAMBLE_RECEIVED_TARGET_POWER+PATH_LOSS'. PREAMBLE_RECEIVED_TARGET_POWER represents a target reception power for an RACH preamble at the eNB.

PREAMBLE_RECEIVED_TARGET_POWER may be calculated to be 'PREAMBLE_INITIAL_RECEIVED_TARGET_POWER+DELTA_PREAMBLE+(PREAMBLE_TRANSMISSION_COUNTER−1)×POWER_RAMPING_STEP'. PREAMBLE_INITIAL_RECEIVED_TARGET_POWER and POWER_RAMPING_STEP may be set and transmitted in system information by the eNB. PREAMBLE_INITIAL_RECEIVED_TARGET_POWER represents a target reception power for an RACH preamble and POWER_RAMPING_STEP represents a power increment for retransmission of the RACH preamble.

DELTA_PREAMBLE is set to a fixed value according to a used RACH preamble format. PREAMBLE_TRANSMISSION_COUNTER is the count of transmissions and retransmissions of an RACH preamble. Each time the RACH preamble is transmitted, PREAMBLE_TRANSMISSION_COUNTER is incremented by 1.

On the other hand, if the error power is smaller than the acquired power offset, the low-power terminal determines to use the extended PRACH resource allocation information.

How to select PRACH resource allocation information according to a comparison result is not limited to the above method. For example, if the error power is equal to the power offset, the low-power terminal may determine to use the extended PRACH resource allocation information. In addition, the opposite case to the above-described case is also possible.

In the case where the used resource identification information is a threshold, the threshold may be fixed to a specific value (e.g. 0) by a standard.

The low-power terminal compares its maximum output power $P_{max}$ with the threshold and selects PRACH resource allocation information to be used for RACH access according to the comparison result.

If the maximum output power $P_{max}$ is equal to or greater than the threshold, the low-power terminal determines to use the basic PRACH resource allocation information. If the maximum output power $P_{max}$ is smaller than the threshold, the low-power terminal determines to use the extended PRACH resource allocation information.

How to select PRACH resource allocation information according to a comparison result is not limited to the above method. For example, if the maximum output power $P_{max}$ is equal to the threshold, the low-power terminal may determine to use the extended PRACH resource allocation information. In addition, the opposite case to the above-described case is also possible.

The low-power terminal may have prior knowledge of the fixed threshold (e.g. 0) set by the standard, without receiving it in system information. In this case, the system information broadcast by the eNB does not need include any used resource identification information.

The above-described third explicit scheme can simplify the operations of the eNB and the low-power terminal for determining PRACH resource allocation information to be used for RACH access, compared to the second explicit scheme.

PRACH resource allocation information is selected in one of the above-described three schemes, only when an RACH preamble is initially transmitted. If the low-power terminal retransmits the RACH preamble, it uses the same PRACH resource allocation information as used for the initial transmission of the RACH preamble.

If the low-power terminal selects PRACH resource allocation information only for initial transmission of an RACH preamble, PREAMBLE_RECEIVED_TARGET_POWER may be determined by calculating PREAMBLE_INITIAL_RECEIVED_POWER+DELTA_PREAMBLE.

Meanwhile, whenever it transmits an RACH preamble, the low-power terminal may select PRACH resource allocation information in one of the above three schemes. One thing to note herein is that the same scheme selected from among the above three schemes is preferably used each time PRACH resource allocation information is selected.

After selecting the PRACH resource allocation information for use in accessing an RACH, the low-power terminal selects an RACH preamble based on the selected PRACH resource allocation information in step 418. Then the low-power terminal transmits a random access preamble configured according to the selected RACH preamble. Herein, the low-power terminal determines the format and transmission power of a PRACH preamble for transmission of the random access preamble based on the selected PRACH resource allocation information.

For example, if the low-power terminal selects the basic PRACH resource allocation information, it transmits a random access preamble based on the basic PRACH resource allocation information. The basic PRACH resource allocation information includes information about PRACH resources in the frequency domain, information about PRACH resources in the time domain, and information about an RACH preamble format, for RACH access of high-power terminals.

On the other hand, if the low-power terminal selects the extended PRACH resource allocation information, it transmits a random access preamble based on the extended PRACH resource allocation information. The extended PRACH resource allocation information includes information about separately allocated PRACH resources in the frequency domain, information about separately allocated PRACH resources in the time domain, and information about an RACH preamble format, for RACH access of low-power terminals.

Upon receipt of the random access preamble from the low-power terminal, the eNB transmits a random access response message to the low-power terminal in step 420. The random access response message includes uplink TA information and uplink resource allocation information for transmission of an uplink message (UL grant for RACH Message 3).

The random access response message may further include bundling information. In this case, the bundling information may not be broadcast in system information.

As stated before, the bundling information includes a bundling application indicator and the number of bundling subframes. The bundling application indicator indicates whether TTI bundling applies to transmission of an uplink message from a low-power terminal. The number of bundling subframes is the number of subframes that will carry an uplink message through TTI bundling from the low-power terminal. The subframes to which TTI bundling is applied are successive.

Upon receipt of the random access response message, the low-power terminal determines whether to apply TTI bundling in step 422. To make the determination, the low-power terminal acquires the bundling information from the system information or the random access response message. Then the low-power terminal determines whether to apply TTI bundling using the bundling application indicator set in the bundling information. That is, the low-power terminal checks whether the bundling application indicator indicates TTI bundling.

If the bundling application indicator indicates TTI bundling, the low-power terminal transmits an uplink message through TTI bundling in step 424. That is, the uplink message is transmitted in as many successive subframes as the number of bundling subframes. The uplink message includes an indicator indicating a low-power terminal and the ID of the low-power terminal.

Thus, resources allocated to the uplink message are extended to the number of bundling subframes along the time axis. The number of bundling subframes is determined from the bundling information. The resources may be allocated to the uplink message by the random access response message.

On the contrary, if the bundling application indicator indicates non-TTI bundling, the low-power terminal transmits the uplink message in the resources of one subframe at an uplink transmission timing according to the random access response message in step 424. That is, the uplink message is transmitted without TTI bundling. The uplink message includes the indicator indicating a low-power terminal and the ID of the low-power terminal.

Figure 5:
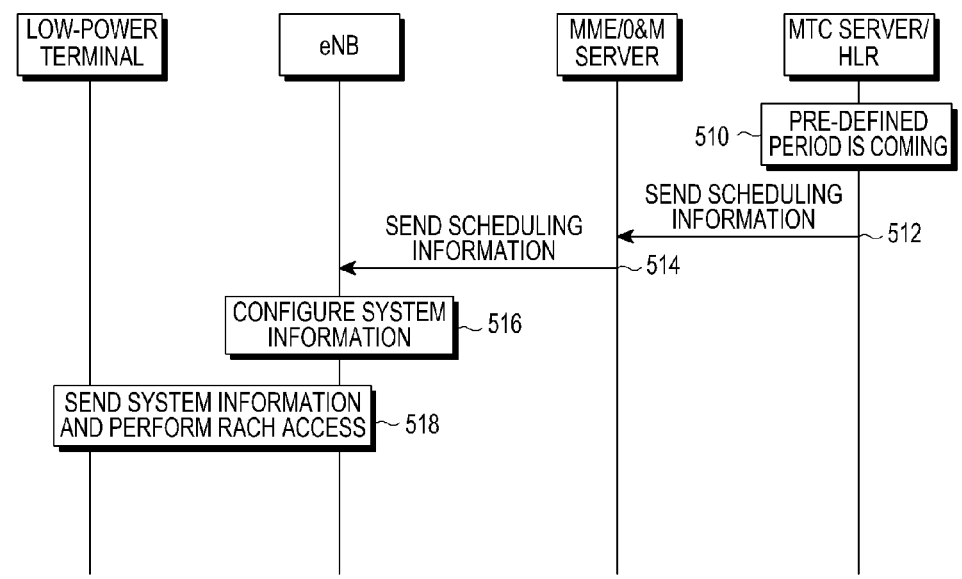
FIG. 5 is a diagram illustrating exemplary signaling in a wireless network for more efficiently supporting the embodiment of the present invention.

FIG. 5 is a diagram illustrating exemplary signaling in a wireless network for more efficiently supporting the embodiment of the present invention.

The illustrated case of FIG. 5 is based on the assumption that transmission/reception of a low-power terminal is limited to a specific time period or time. For example, the specific time period or time for transmission and reception may be set or changed by an operator. The limit on transmission and reception for the low-power terminal is intended to use a specific time zone of night or earlier morning when much voice or data traffic is not generated and thus not to affect voice and data communication of high-power terminals. Thus the embodiment of the present invention is applicable to a metering device that measures a power or water consumption and reports the measurement to a server.

Referring to FIG. 5, information about a time period or time at which the low-power terminal is allowed to transmit and receive data is configured in advance in an MTC server/HLR. The MTC server/HLR monitors whether the preset time period or time is coming in step 510.

If the preset time period or time is coming, the MTC server/HLR transmits scheduling information to an MME/O&M server in step 512. The scheduling information is used to schedule PRACH resource allocation for low-power terminals. For example, the scheduling information specifies an allowed time period or time for transmission and reception of low-power terminals, the number of low-power terminals in each region (e.g. in each cell or paging zone), and information about the low-power terminals.

The information about the number of low-power terminals in each region indicates the number of low-power terminals for which transmission/reception is allowed in the allowed time period or time or which are supposed to transmit or receive data in the allowed time period or time. The information about low-power terminals specifies the maximum output power levels of the low-power terminals.

Upon receipt of the scheduling information, the MME/O&M server transmits the received scheduling information to an eNB in step 514. The scheduling information has been described above. The scheduling information is transmitted when the preset allowed transmission/reception time period or time is coming for the low-power terminal.

The eNB configures system information in step 516. To configure the system information, the eNB allocates PRACH resources to the low-power terminal. Then the eNB configures the system information including PRACH resource allocation information indicating the allocated PRACH resources.

The system information may be configured when the preset allowed transmission/reception time period or time is coming for the low-power terminal. The preset allowed transmission/reception time period or time for the low-power terminal may be detected from the received scheduling information. If the preset allowed transmission/reception time period or time has elapsed, the eNB releases the allocated PRACH resources from the low-power terminal.

When allocating the PRACH resources to low-power terminal, the eNB determines the amount of the PRACH resources according to the number of low-power terminals in each region, set in the scheduling information. Also, the eNB determines whether extended PRACH resource allocation information is needed for the low-power terminals according to the information about low-power terminals set in the scheduling information.

After the system information is configured, the low-power terminal performs an RACH access procedure based on the system information in the same manner as FIG. 4 in step 518.

As described above, the MTC server/HLR notifies the MME/O&M server of the number of low-power terminals in each region so as to allow the eNB to efficiently allocate PRACH resources to low-power terminals. The MME/O&M server transmits information about the number of low-power terminals in each region to the eNB. In addition to the information about the number of low-power terminals in each region, detailed information about the configuration of the low-power terminals may be transmitted to the eNB. For example, an allowed data size for transmission of the low-power terminals or an allowed time period or time for transmission and reception of the low-power terminals may further be indicated.

Figure 6:
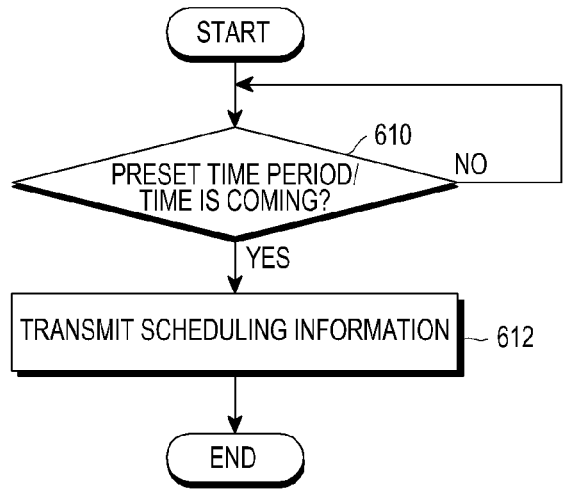
FIG. 6 is a flowchart illustrating a control operation of a Machine Type Communication (MTC) server/Home Location Register (HLR) according to an embodiment of the present invention.

FIG. 6 is a flowchart illustrating a control operation of the MTC server/HLR according to an embodiment of the present invention.

Referring to FIG. 6, the MTC server/HLR monitors whether a preset allowed time period or time for transmission/reception of a low-power terminal is coming in step 610.

When the preset allowed time period or time for transmission/reception of the low-power terminal is coming, the MTC server/HLR transmits scheduling information to the MME/O&M server in step 612. The scheduling information schedules PRACH resource allocation for low-power terminals. For example, the scheduling information specifies an allowed time period or time for transmission and reception of low-power terminals, the number of low-power terminals in each region (e.g. in each cell or paging zone), and information about the low-power terminals.

The information about the number of low-power terminals in each region indicates the number of low-power terminals for which transmission/reception is allowed in the allowed time period or time or which are expected to transmit or receive data in the allowed time period or time. The information about low-power terminals specifies the maximum output power levels of the low-power terminals.

Step 610 is optional and thus step 612 may be performed irrespective of whether the preset allowed time period or time for transmission/reception of the low-power terminal is coming.

Figure 7:
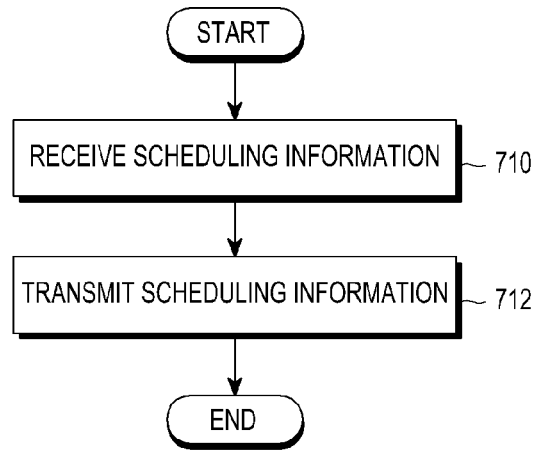
FIG. 7 is a flowchart illustrating a control operation of a Mobility Management Entity/Operations and Maintenance (MME/O&M) server according to an embodiment of the present invention.

FIG. 7 is a flowchart illustrating a control operation of the MME/O&M server according to an embodiment of the present invention.

Referring to FIG. 7, the MME/O & M server receives scheduling information from the MTC server/HLR in step 710. Then the MME/O&M server transmits the received scheduling information to the eNB in step 712. The scheduling information has been described before. For instance, the scheduling information may be transmitted when the preset allowed transmission/reception time period or time is coming for the low-power terminal.

Figure 8:
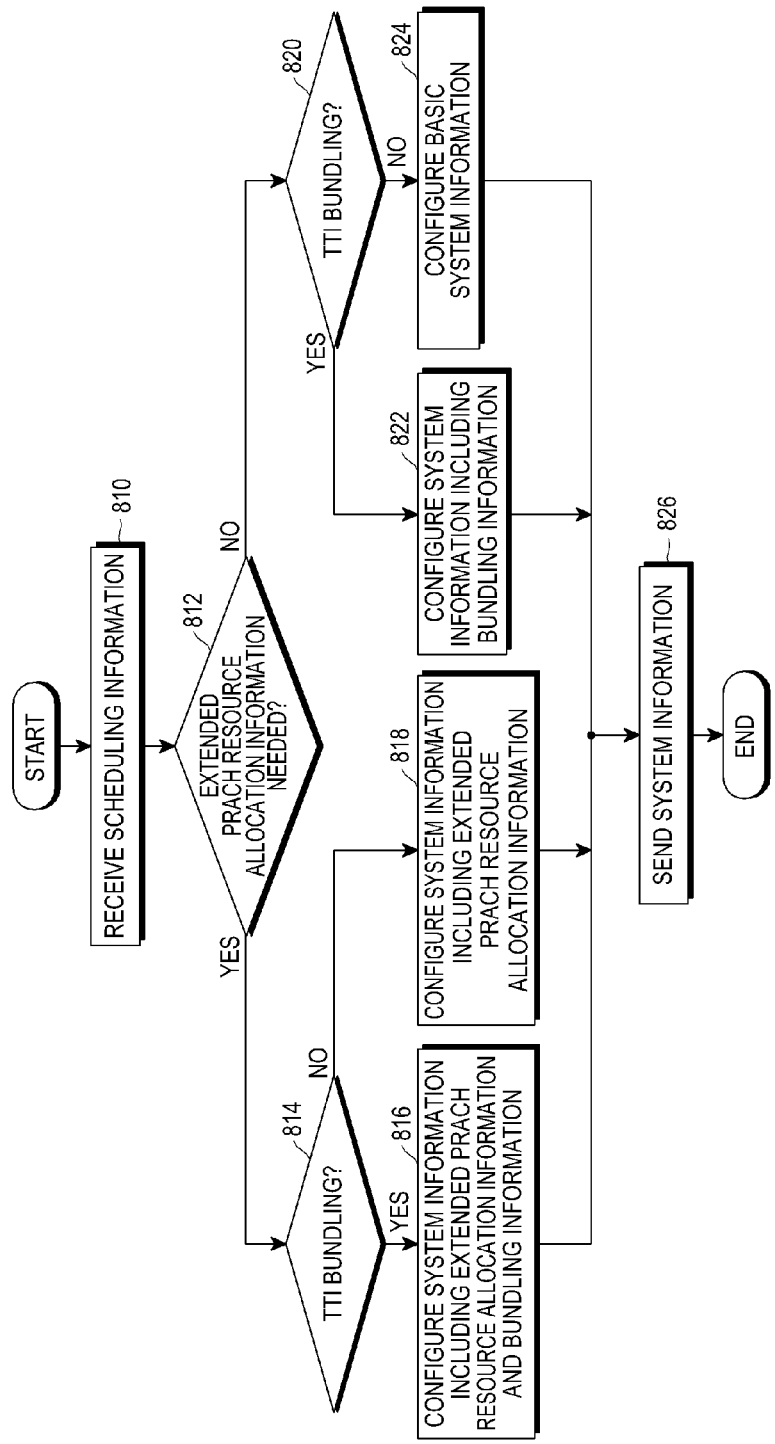
FIG. 8 is a flowchart illustrating a control operation of an eNB for broadcasting system information at an eNB according to an embodiment of the present invention.

FIG. 8 is a flowchart illustrating a control operation for broadcasting system information at the eNB according to an embodiment of the present invention.

Referring to FIG. 8, the eNB receives scheduling information from the MME/O&M server in step 810 and determines whether extended PRACH resource allocation information is needed in step 812. The determination may be made, taking into account the positions of low-power terminals in a cell and the size of the cell.

For example, if a low-power terminal is nearby or the size of the cell is small, the eNB determines that extended PRACH resource allocation information is not needed because the low-power terminal can successfully transmit a random access preamble using basic PRACH resource allocation information configured for high-power terminals.

However, if the low-power terminal is away from the eNB by a predetermined distance or longer or the cell is large, the eNB determines that the extended PRACH resource allocation information is needed because the low-power terminal cannot successfully transmit a random access preamble using the basic PRACH resource allocation information configured for high-power terminals.

The cell size or the distance to the eNB, which allows the low-power terminal to successfully transmit a random access preamble using the basic PRACH resource allocation information configured for high-power terminals is taken into account to determine the necessity of the extended PRACH resource allocation information.

In addition, when as many low-power terminals as or more low-power terminals than a threshold exist in the cell, the eNB may determine that extended PRACH resource allocation information is required for the low-power terminals. For example, the threshold may be set according to the number of low-power terminals that cannot successfully transmit an RACH preamble using an RACH preamble format designed for high-power terminals. An RACH preamble format is one element of basic PRACH resource allocation information and extended PRACH resource allocation information. Since low-power terminals cannot successfully transmit an RACH preamble using the RACH preamble format set in the basic PRACH resource allocation information, they need extended PRACH resource allocation information to acquire another RACH preamble format.

The basic PRACH resource allocation information includes information about PRACH resources in the frequency domain for high-power terminals, information about PRACH resources in the time domain for the high-power terminals, and information about an RACH preamble format designed for the high-power terminals. The extended PRACH resource allocation information includes information about PRACH resources in the frequency domain for low-power terminals, information about PRACH resources in the time domain for the low-power terminals, and information about an RACH preamble format designed for the low-power terminals.

When the extended PRACH resource allocation information is needed, the eNB determines whether to use TTI bundling in step 814. On the contrary, if the extended PRACH resource allocation information is not needed, the eNB determines whether to use TTI bundling in step 820.

For example, if a large number of low-power terminals exist in the cell and cannot successfully transmit an uplink message in a single subframe, the eNB may determine that TTI bundling is necessary.

Upon completion of determining as to whether to use TTI bundling in step 814 or 820, the eNB configures system information according to the determinations made before in step 816.

According to the already-made determinations, four combinations can be considered: both extended PRACH resource allocation information and TTI bundling are needed (Combination 1), extended PRACH resource allocation information is needed but TTI bundling is not needed (Combination 2), extended PRACH resource allocation information is not needed but TTI bundling is needed (Combination 3), and neither extended PRACH resource allocation information nor TTI bundling is needed (Combination 4).

System information configured according to Combination 1 includes used resource identification information, extended PRACH resource allocation information, basic PRACH resource allocation information, and RACH access information. The used resource identification information indicates that an RACH access is to be attempted based on the extended PRACH resource allocation information.

The used resource identification information may be realized in an explicit manner using one of the afore-described schemes, that is, using a used resource identification bit, a power offset, or a threshold.

The RACH access information includes bundling information needed to apply TTI bundling. The bundling information includes a bundling application indicator and the number of bundling subframes. In case of Combination 1, the bundling application indicator indicates that TTI bundling is to be used when a low-power terminal transmits an uplink message. The number of bundling subframes is the number of subframes in which the uplink message is to be transmitted through TTI bundling. These subframes are successive.

System information configured according to Combination 2 includes used resource identification information, extended PRACH resource allocation information, basic PRACH resource allocation information, and RACH access information. The used resource identification information indicates that an RACH access is to be attempted based on the extended PRACH resource allocation information. The used resource identification information may be configured in an explicit manner using one of the afore-described schemes, that is, using a used resource identification bit, a power offset, or a threshold.

In case of Combination 2, the bundling application indicator of the bundling information set in the RACH access information indicates that TTI bundling is not to be used when a low-power terminal transmits an uplink message. Therefore, the bundling information does not specify the number of bundling subframes.

System information configured according to Combination 3 includes used resource identification information, extended PRACH resource allocation information, basic PRACH resource allocation information, and RACH access information. The used resource identification information indicates that an RACH access is to be attempted based on the basic PRACH resource allocation information. The used resource identification information may be configured in an explicit manner using one of the afore-described schemes, that is, using a used resource identification bit, a power offset, or a threshold.

In case of Combination 3, the bundling application indicator indicates that TTI bundling is to be used when a low-power terminal transmits an uplink message. Therefore, the bundling information specifies the number of bundling subframes. System information configured according to combination 4 includes used resource identification information, extended PRACH resource allocation information, basic PRACH resource allocation information, and RACH access information. The used resource identification information indicates that an RACH access is to be attempted based on the basic PRACH resource allocation information. The used resource identification information may be configured in an explicit manner using one of the afore-described schemes, that is, using a used resource identification bit, a power offset, or a threshold.

In case of Combination 4, the bundling application indicator indicates that TTI bundling is not to be used when a low-power terminal transmits an uplink message. Therefore, the bundling information does not specify the number of bundling subframes.

If a power offset is used as the used resource identification information in Combination 1 to Combination 4, the power offset can be set based on the scheduling information received from the MME/O&M server.

Upon completion of configuring the system information in the above manner, the eNB broadcasts the system information in step 1818. If the system information is changed system information, the eNB does not increase a value tag, which might otherwise indicate the change of the system information, in order to prevent the system information configured for low-power terminals from affecting high-power terminals. The afore-described schemes that prevent system information configured for low-power terminals from affecting high-power terminals can be implemented.

The above description has been given with the appreciation that both basic PRACH resource allocation information and extended PRACH resource allocation information are transmitted in system information, by way of example.

Meanwhile, the basic PRACH resource allocation information and the extended PRACH resource allocation information may be transmitted in different system information, which is, in basic system information and extended system information, respectively. In this case, the extended system information may not include the basic PRACH resource allocation information.

In another example, the basic system information includes the used resource identification information and the extended system information may include the extended PRACH resource allocation information. In this case, the low-power terminal may or may not receive the extended system information according to the used resource identification information.

The bundling information may be delivered to the low-power terminal in a random access response message, instead of RACH access information included in system information. In this case, the bundling information may not be contained in the RACH access information.

While not shown, the eNB may allocate PRACH resources to the low-power terminal based on the scheduling information received from the MME/O&M server, before determining whether extended PRACH resource allocation information is needed. That is, before step 812, the eNB determines the start time of allocating PRACH resources to the low-power terminal, an allocation period of PRACH resources in the time domain, PRACH frequency resources, an RACH preamble format, TTI bundling or non-TTI bundling, and the number of successive subframes for TTI bundling.

Figure 9:
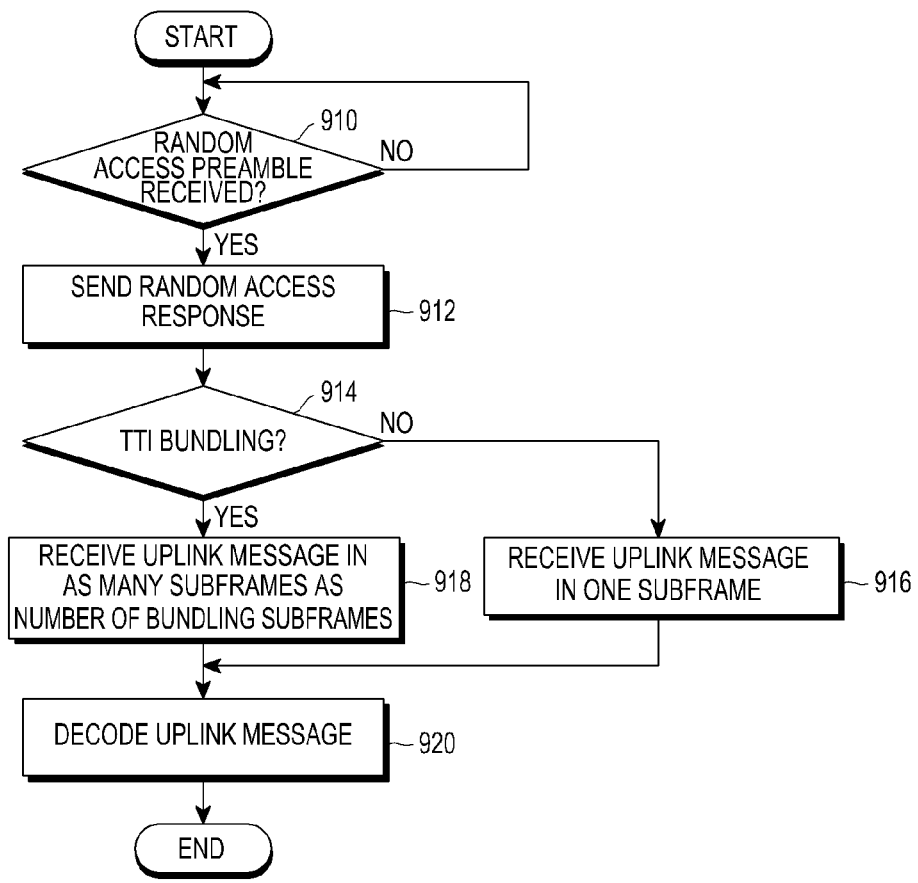
FIG. 9 is a flowchart illustrating a control operation of the eNB to allow a low-power terminal to access an RACH according to an embodiment of the present invention.

FIG. 9 is a flowchart illustrating a control operation of the eNB for RACH access according to an embodiment of the present invention.

Referring to FIG. 9, the eNB receives a random access preamble from a terminal in step 910 and replies to the terminal with a random access response message in step 912. The random access response message includes uplink TA information and a UL grant for RACH MSG 3.

If it is determined that TTI bundling applies to uplink message transmission, bundling information may be added to the random access response message. In this case, the bundling information is not broadcast in system information.

The eNB allocates resources required for TTI bundling to the terminal. For instance, the eNB allocates as much resources as the number of successive subframes set in the bundling information, for transmission of an uplink message. Therefore, the eNB determines the uplink resource allocation information, i.e. the UL grant for RACH Message 3, taking into account the number of successive subframes to which TTI bundling is applied.

After transmitting the random access response message, the eNB determines whether to use TTI bundling in step 914. For example, the determination may be made based on resources carrying the received random access preamble or an RACH preamble used for the received random access preamble.

The former case is based on the premise that specific PARCH resources for a random access preamble are preset for TTI bundling and related system information is broadcast. This scheme is applicable to all RACH preambles received in the specific PRACH resources allocated to low-power terminals.

In the latter case, when a preset RACH preamble is received, the eNB determines to apply TTI bundling. Therefore, it is necessary to broadcast identification information indicating at least one preset RACH preamble preserved for TTI bundling in system information, in advance.

When determining that TTI bundling is not applied in the above manner, the eNB receives an uplink message from the low-power terminal in a single subframe in step 916. On the other hand, when determining that TTI bundling is used, the eNB receives an uplink message in as many successive subframes as the number of subframes set for TTI bundling from the low-power terminal in step 918.

In step 920, the eNB decodes the received uplink message. If the uplink message has been received in one subframe, the eNB decodes the one subframe. If the uplink message has been received in as many successive subframes as the preset number of subframes for TTI bundling, the eNB decodes the received subframes.

In the illustrated case of FIG. 9, the eNB determines whether TTI bundling is applied after transmitting the random access response message. However, it is also possible to determine whether TTI bundling is applied and then to transmit the random access response message according to the determination result.

Figure 10:
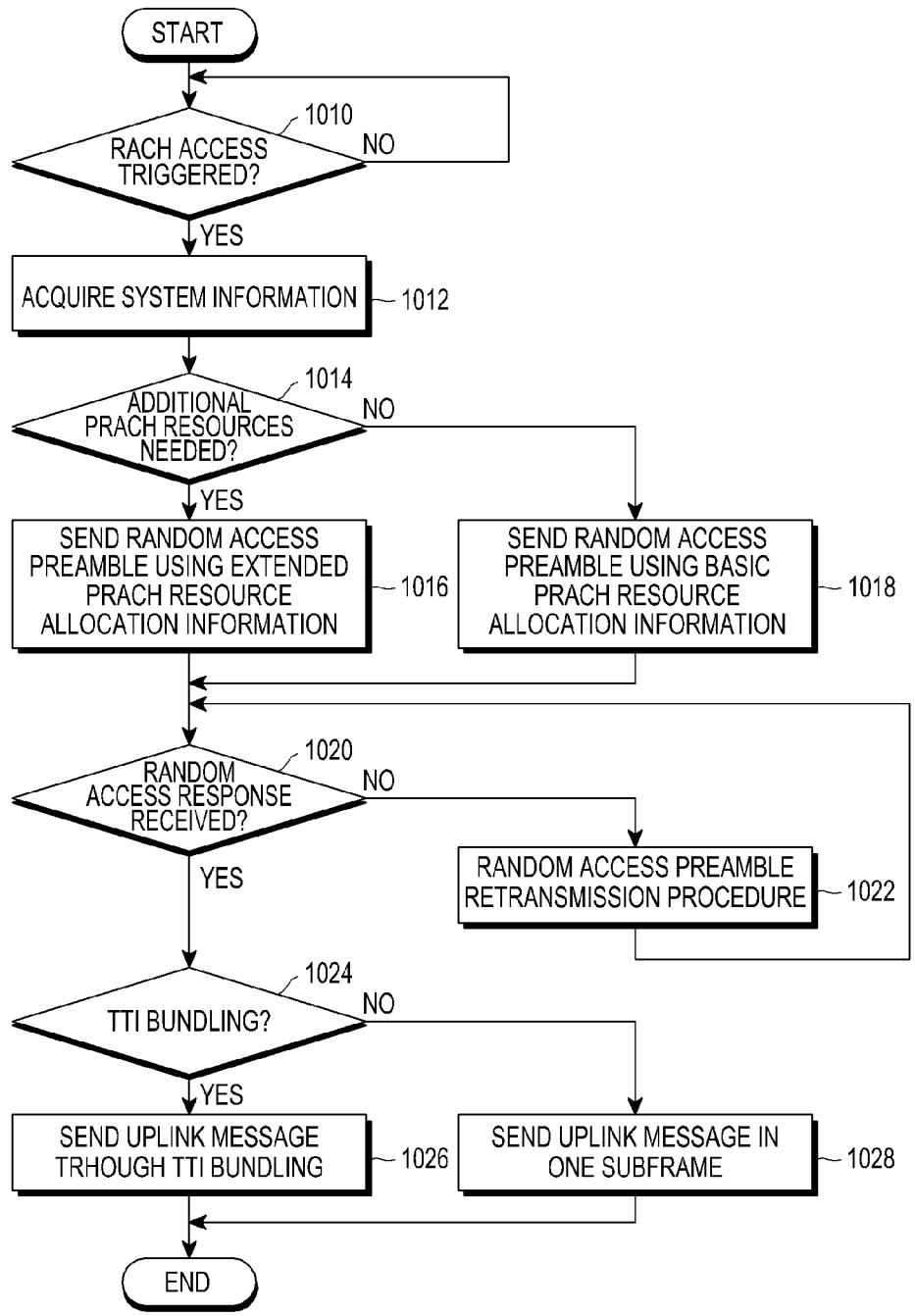
FIG. 10 is a flowchart illustrating a control operation of a low-power terminal for accessing an RACH according to an embodiment of the present invention.

FIG. 10 is a flowchart illustrating a control operation for accessing an RACH at the low-power terminal according to an embodiment of the present invention.

Referring to FIG. 10, the low-power terminal monitors whether an RACH access has been triggered in step 1010. For example, when the operation mode of the low-power terminal is transitioned from idle mode to active mode upon request of a higher layer, the RACH access may be triggered. The operation mode transition is requested mainly when an uplink message to be transmitted on an RACH is generated.

When the RACH access is triggered, the low-power terminal acquires or reacquires system information in a cell because previous system information acquired from the current cell is considered invalid. While not shown, if an RACH access has been triggered at a high-power terminal, the high-power terminal performs an RACH access procedure as defined in a 3GPP specification TS36.361 based on PRACH resource information set in previous system information acquired from the current cell.

In step 1014, the low-power terminal identifies PRACH resources to be used for RACH access based on the acquired or reacquired system information. That is, the low-power terminal determines whether to perform an RACH access using basic PRACH resource allocation information or extended PRACH resource allocation information.

The determination may be made in an explicit or implicit manner.

In an explicit scheme, the low-power terminal makes the determination using used resource identification information set in system information broadcast from the eNB. The afore-described three schemes can be used for the determination in an explicit manner. In an implicit scheme, the low-power terminal makes the determination by checking whether the system information broadcast from the cell includes extended PRACH resource allocation information.

If determining to use extended PRACH resource allocation information, the low-power terminal checks the extended PRACH resource allocation information in the acquired or reacquired system information in step 1016. Then the low-power terminal transmits a random access preamble to the eNB based on the extended PRACH resource allocation information.

If determining to use basic PRACH resource allocation information, the low-power terminal checks the basic PRACH resource allocation information in the acquired or reacquired system information in step 1018. Then the low-power terminal transmits a random access preamble to the eNB based on the basic PRACH resource allocation information.

After transmitting the random access preamble, the low-power terminal monitors reception of a random access response message from the eNB in step 1020.

If the low-power terminal fails to receive the random access response message, it performs a random access preamble retransmission procedure in step 1022. The low-power terminal may retransmit the random access preamble at a higher power level than during the initial transmission of the random access preamble.

Upon receipt of the random access response message, the low-power terminal determines whether TTI bundling is applied in step 1024. TTI bundling or non-TTI bundling may be determined using bundling information set in the acquired or reacquired system information or in the random access response message. Specifically, a bundling application indicator of the bundling information indicates whether TTI bundling is applied or not.

If the bundling application indicator indicates TTI bundling, the low-power terminal proceeds to step 1026. If the bundling application indicator indicates non-TTI bundling, the low-power terminal proceeds to step 1028.

In another embodiment of determining whether TTI bundling is applied, if a specific RACH preamble is reserved for TTI bundling, TTI bundling or non-TTI bundling may be determined according to an RACH preamble used for transmitting the random access preamble.

For example, if the RACH preamble transmitted to the eNB in step 1016 or 1018 is the specific RACH preamble, the low-power terminal determines to use TTI bundling in step 1024. On the other hand, if the RACH preamble transmitted to the eNB in step 1016 or 1018 is not the specific RACH preamble, the low-power terminal determines not to use TTI bundling in step 1024. For this operation, the low-power terminal should be able to receive information about the specific RACH preamble in system information from the eNB.

In step 1026, the low-power terminal transmits an uplink message through TTI bundling to the eNB. Resources for transmitting the uplink message through TTI bundling may be allocated by the random access response message. The number of subframes to carry the uplink message through TTI bundling is determined based on the bundling information included in the acquired or reacquired system information or the random access response message. That is, the low-power terminal checks the number of bundling subframes in the bundling information and transmits the uplink message in as many successive subframes as the checked number of bundling subframes.

In step 1028, the low-power terminal transmits an uplink message in one subframe without TTI bundling to the eNB. Resources used for the uplink message may be allocated by the random access response message.

Figure 11:
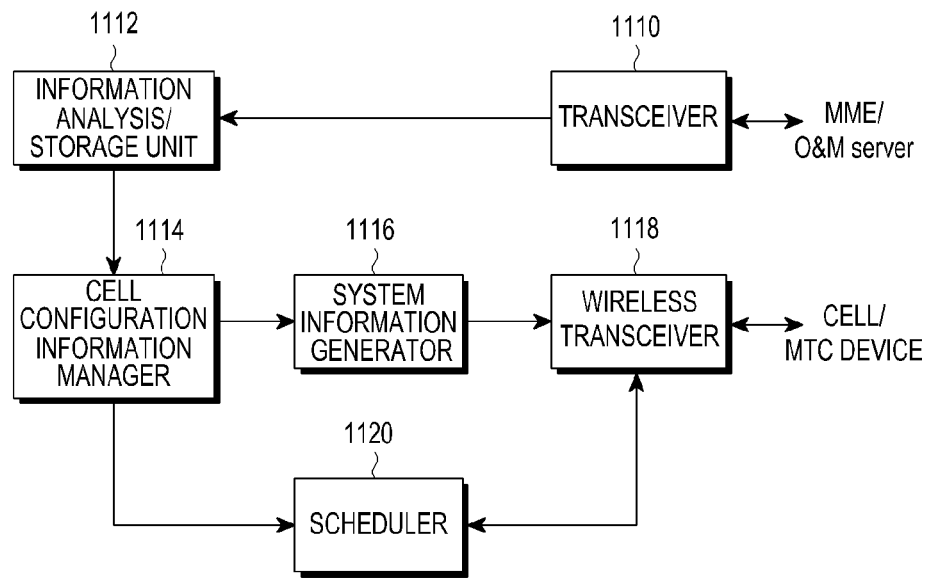
FIG. 11 is a block diagram of the eNB according to an embodiment of the present invention.

FIG. 11 is a block diagram of the eNB according to an embodiment of the present invention.

Referring to FIG. 11, a transceiver 1110 communicates with the MME/O&M server. The transceiver 1110 receives scheduling information from the MME/O&M server. The scheduling information specifies the number of low-power terminals in each region and characteristics of the low-power terminals.

An information analysis/storage unit 1112 analyzes information about low-power terminals included in the received scheduling information and stores the analysis result. The analysis result is provided to a cell configuration information manager 1114.

The cell configuration information manager 1114 determines whether to allocate PRACH resources separately to low-power terminals and whether to apply TTI bundling to uplink message transmission and provides the determination results to a system information generator 1116.

The system information generator 1116 generates extended system information based on PRACH resource allocation information and bundling information determined by the cell configuration information manager 1114. System information generated from the system information generator 1116 is broadcast within a cell through a wireless transceiver 1118.

A scheduler 1120 analyzes an RACH preamble received through the wireless transceiver 1118 and allocates appropriate uplink resources for transmission of an uplink message according to the received RACH preamble. Information about uplink resources allocated for transmission of an uplink message is carried in a random access response message.

The wireless transceiver 1118 transmits the random access response message in response to a random access preamble to a low-power terminal.

In case of TTI bundling for the uplink message transmission, bundling information is included in the system information or the random access response message.

In addition, the scheduler 1120 commands the wireless transceiver 1118 to decode the uplink message in as many successive subframes as a predetermined number of subframes for TTI bundling.

Figure 12:
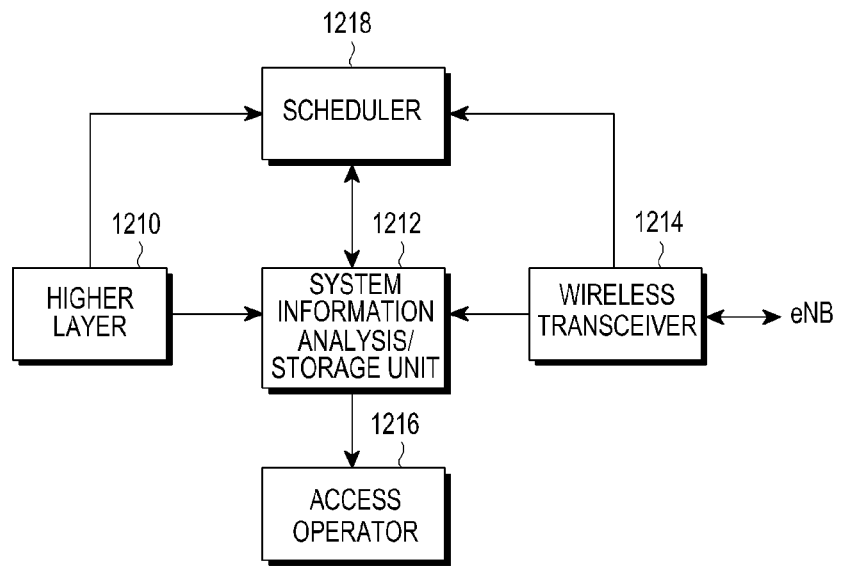
FIG. 12 is a block diagram of the low-power terminal according to an embodiment of the present invention.

FIG. 12 is a block diagram of the low-power terminal according to an embodiment of the present invention.

Referring to FIG. 12, a higher layer 1210 triggers an RACH access or an uplink message transmission. Upon triggering of an RACH access, the higher layer 120 transmits an uplink message to a scheduler 1218. The scheduler 1218 stores the received uplink message.

A wireless transceiver 1214 receives system information broadcast in a cell by an eNB and a random access response message from the eNB and provides the received system information and random access response message to a system information analysis/storage unit 1212. The wireless transceiver 1214 also transmits a random access preamble to the eNB.

The system information analysis/storage unit 1212 analyzes the system information received from the wireless transceiver 1214 and stores the analysis result. The system information analysis/storage unit 1212 selects PRACH resources to be used between basic PRACH resources and extended PRACH resources based on the analysis result. Then the system information analysis/storage unit 1212 acquires PRACH resource allocation information corresponding to the determined PRACH resources. For instance, if determining to use basic PRACH resources, the system information analysis/storage unit 1212 acquires basic PRACH resource allocation information. If determining to use extended PRACH resources, the system information analysis/storage unit 1212 acquires extended PRACH resource allocation information.

Then the system information analysis/storage unit 1212 provides the acquired basic or extended PRACH resource allocation information to an access operator 1216.

In addition, the system information analysis/storage unit 1212 determines whether TTI bundling is applied by analyzing the system information or the random access response message. The system information analysis/storage unit 1212 may make the determination using the RACH preamble transmitted to the eNB before. For instance, if the transmitted RACH preamble is an RACH preamble reserved for TTI bundling, the system information analysis/storage unit 1212 determines that TTI bundling is applied.

If determining that TTI bundling is applied, the system information analysis/storage unit 1212 checks the number of subframes for use in TTI bundling by analyzing the system information or the random access response message. On the contrary, if determining that TTI bundling is not applied, the system information analysis/storage unit 1212 does not check the number of subframes for use in TTI bundling.

The system information analysis/storage unit 1212 notifies the scheduler 1218 of whether to apply TTI bundling to uplink message transmission and the number of bundling subframes, if TTI bundling is applied.

The access operator 1216 selects an RACH preamble based on the basic or extended PRACH resource allocation information received from the system information analysis/storage unit 1212 and transmits a random access preamble based on the RACH preamble to the eNB through the wireless transceiver 1214.

Upon receipt of information indicating TTI bundling and the number of bundling subframes from the system information analysis/storage unit 1212, the scheduler 1218 controls the wireless transceiver 1214 to transmit an uplink message in as many successive subframes as the number of bundling subframes.

While the invention has been shown and described with reference to certain embodiments of the present invention thereof, it will be understood by those skilled in the art that various changes in form and details may be made therein. Therefore, the scope of the invention should be determined by the appended claims and their legal equivalents, not by the above description, and all changes coming within the meaning and equivalency range of the appended claims are intended to be embraced therein.

The invention claimed is:

1. A method for transmitting a random access preamble at a terminal in a wireless communication system, the method comprising:
    acquiring, from a Base Station (BS), a first random access information and a second random access information; and
    transmitting, to the BS, the random access preamble based on one of the first random access information and the second random access information,
    wherein each of the first random access information and the second random access information includes information indicating a time allocated to the terminal for transmitting the random access preamble.

2. The method of claim 1, wherein the first random access information and the second random access information further include information for a random access preamble configuration.

3. The method of claim 2, wherein the random access preamble configuration relates to a length of the random access preamble.

4. The method of claim 1, wherein at least one of the first random access information and the second random access information further include information related to a power offset.

5. The method of claim 1, wherein the first random access information is for basic information and the second random access information is for extended information.

6. A terminal for transmitting a random access preamble in a wireless communication system, the terminal comprising:
    a transceiver for receiving, from a Base Station (BS), a first random access information and a second random access information, and for transmitting, to the BS, the random access preamble based on one of the first random access information and the second random access information,
    wherein each of the first random access information and the second random access information includes information indicating a time allocated to the terminal for transmitting the random access preamble.

7. The terminal of claim 6, wherein the first random access information and the second random access information further include information for a random access preamble configuration.

8. The terminal of claim 7, wherein the random access preamble configuration relates to a length of the random access preamble.

9. The terminal of claim 6, wherein at least one of the first random access information and the second random access information further include information related to a power offset.

10. The terminal of claim 6, wherein the first random access information is for basic information and the second random access information is for extended information.

11. A method for receiving a random access preamble from a terminal at a Base Station (BS) in a wireless communication system, the method comprising:
    transmitting a first random access information and a second random access information; and
    receiving, from the UE, a random access preamble based on one of the first random access information and the second random access information,
    wherein each of the first random access information and the second random access information includes information indicating a time allocated to the terminal for transmitting the random access preamble.

12. The method of claim 11, wherein the first random access information and the second random access information further include information for a random access preamble configuration.

13. The method of claim 12, wherein the random access preamble configuration relates to a length of the random access preamble.

14. The method of claim 11, wherein at least one of the first random access information and the second random access information further include information related to a power offset.

15. The method of claim 11, wherein the first random access information is for basic information and the second random access information is for extended information.

16. A Base Station (BS) for receiving a random access preamble from a terminal in a wireless communication system, the BS comprising:

a processor for generating a first random access information and a second random access information; and a wireless transceiver for receiving, from the UE, the random access preamble based on one of the first random access information and the second random access information, wherein each of the first random access information and the second random access information includes information indicating a time allocated to the terminal for transmitting the random access preamble.

17. The BS of claim 16, wherein the first random access information and the second random access information further include information for a random access preamble configuration.

18. The BS of claim 17, wherein the random access preamble configuration relates to a length of the random access preamble.

19. The BS of claim 16, wherein at least one of the first random access information and the second random access information further include information related to a power offset.

20. The BS of claim 16, wherein the first random access information is for basic information and the second random access information is for extended information.

* * * * *